(No Model.)

F. B. PARKER.
RUNNING GEAR FOR VEHICLES.

No. 409,298. Patented Aug. 20, 1889.

Witnesses
N. B. Harris

Inventor
Frank B. Parker
By his Attorneys.
McGrew & Small

UNITED STATES PATENT OFFICE.

FRANK B. PARKER, OF ST. JOSEPH, MISSOURI.

RUNNING-GEAR FOR VEHICLES.

SPECIFICATION forming part of Letters Patent No. 409,298, dated August 20, 1889.

Application filed January 31, 1889. Serial No. 298,186. (No model.)

*To all whom it may concern:*

Be it known that I, FRANK B. PARKER, a citizen of the United States, residing at St. Joseph, in the county of Buchanan and State of Missouri, have invented certain new and useful Improvements in Running-Gear for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to running-gear for vehicles; and it consists of the novel combination and construction of devices, as will be hereinafter fully described and claimed.

The primary object of my invention is to provide a novel running-gear for vehicles, in which the rear axle is pivotally supported and is connected by intermediate devices with the front axle, so as to be simultaneously and automatically turned at a reversely-inclined angle to the position of the front axle, thereby adapting the vehicle to turn sharp corners without danger of upsetting, and enabling the rear wheels to clear obstructions in its path to better advantage, as the rear wheels follow exactly in the path of the front wheels.

A further object of my invention is to provide the connections intermediate of the front and rear axles with means for taking up sudden shocks or jars on the connections, and thereby relieve the latter from the danger of fracture and breakage.

Figure 1:
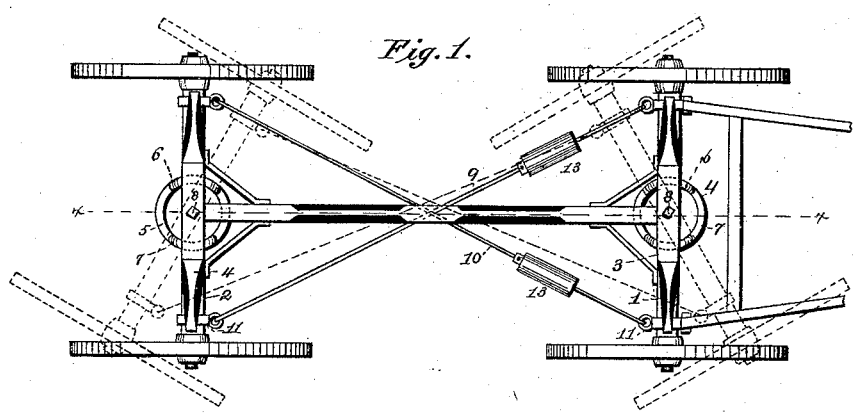
Figure 2:
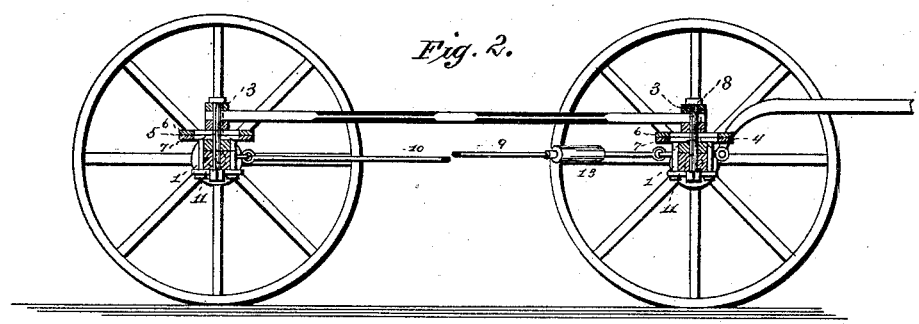
Figure 3:
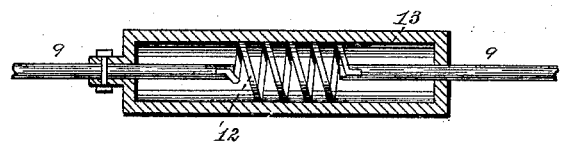

In the accompanying drawings, Figure 1 is a plan view of a vehicle running-gear embodying my invention, showing in dotted lines the positions of the front and rear axle and wheels in turning a sharp angle or corner. Fig. 2 is a vertical longitudinal sectional view on the line *x x* of Fig. 1. Fig. 3 is a vertical detail sectional view showing the spring for taking up sudden strains or jars on the sectional coupling-rod.

Referring to the drawings, in which like letters of reference denote corresponding parts in all the figures, 1 2 designate the front and rear axle of my improved running-gear. 3 4 are the bolsters to which the body is secured, and 4 5 are the fifth-wheels, applied, respectively, to the front and rear axles and the bolsters thereof. Each fifth-wheel consists of two members 6 and 7, one of which is bolted to one of the axles and the other is likewise secured to the corresponding bolster. The two members of each fifth-wheel are arranged in contact laterally with each other, and said members of the fifth-wheel, the axle, and bolster are securely connected together to adapt the axle to change its relative position to the bolster by means of a vertical king-bolt 8, which passes centrally through the members and is fixed in the axle and bolster.

Horizontal connecting-rods 9 10 are arranged diagonally between the front and rear axles, so as to cross or lap each other at their middle, the ends of said rods being securely connected by means of clamps 11 to the axles of the vehicle. One end of one rod is connected to one end of the front axle and the other end of said rod is connected to the opposite end of the rear axle, and the other rod is likewise disposed or arranged with relation to the front and rear axles.

By reference to Fig. 1 of the drawings it will be noted that when the angle or position of the front axle is changed from its normal position the connecting-rods 9 10 are moved endwise to force the rear axle in an inclined position the reverse of the front axle, thereby causing the wheels of the rear axle to travel in the same path of the wheels on the front axle, which enables the vehicle to turn sharp corners and clear objects in its path to better advantage.

To obviate the danger of breaking the connecting-rods, due to sudden strain or jar thereon in passing over rocks, car-tracks, and other obstructions in the path of the vehicle, I have provided each connecting-rod with a take-up spring 12, which is adapted to be extended and relieve the rod of sudden strains. Each connecting-rod is made in two sections, one being considerably shorter than the other, and these sections are connected or coupled together by the take-up spring. This spring is located near one of the axles, (the front one,) and it is housed within a suitable tubular case 13. This tubular case is fixed to one of the sections of the connecting-rod, while the other section of said rod is capable of movement longitudinally within said case, so that the rod can be extended longitudinally when the take-up spring is expanded. This take-up spring is securely connected to the approximate ends of the sections of the coupling-rod, and it is of high retractile power, so as to draw the two sections of the rod together when the axles are returned to their normal parallel positions.

The operation and advantages of my invention will be readily understood by those skilled in the art to which it relates from the foregoing description, taken in connection with the drawings, and need not, therefore, be more particularly referred to here.

My improvements can be applied to trucks, and I would therefore have it understood that I reserve the right to apply my invention to different kinds of vehicles and to make such changes and alterations in the details of construction and form and proportion of parts as fairly fall within the scope of my invention.

Having thus fully described my invention, what I claim as new, and desire to secure by Letters Patent, is—

1. In a running-gear for vehicles, the combination of the adjustable front and rear axles and the longitudinally-extensible connecting-rods intermediate of the axles, and a take-up spring connecting the sections of each rod together, substantially as described.

2. In a running-gear for vehicles, the combination of the adjustable front and rear axles and the longitudinally-extensible connecting-rods arranged diagonally between said axles, and each having a take-up spring for relieving said rod of undue strain, substantially as described.

3. In a running-gear for vehicles, the combination of the adjustable front and rear axles, the sectional extensible connecting-rods intermediate of said axles, a tubular case fixed to one of said rod-sections and having the other rod-section movable longitudinally thereon, and a take-up spring housed in said case and connected to the approximate ends of the rod-sections, substantially as described.

In testimony whereof I affix my signature in presence of two witnesses.

FRANK B. PARKER.

Witnesses:
PETER J. CAROLUS,
JOHN F. IMEL.